Jan. 15, 1952  H. W. HEM  2,582,485
WEIGHING SCALE POISE
Filed March 23, 1946  2 SHEETS—SHEET 1
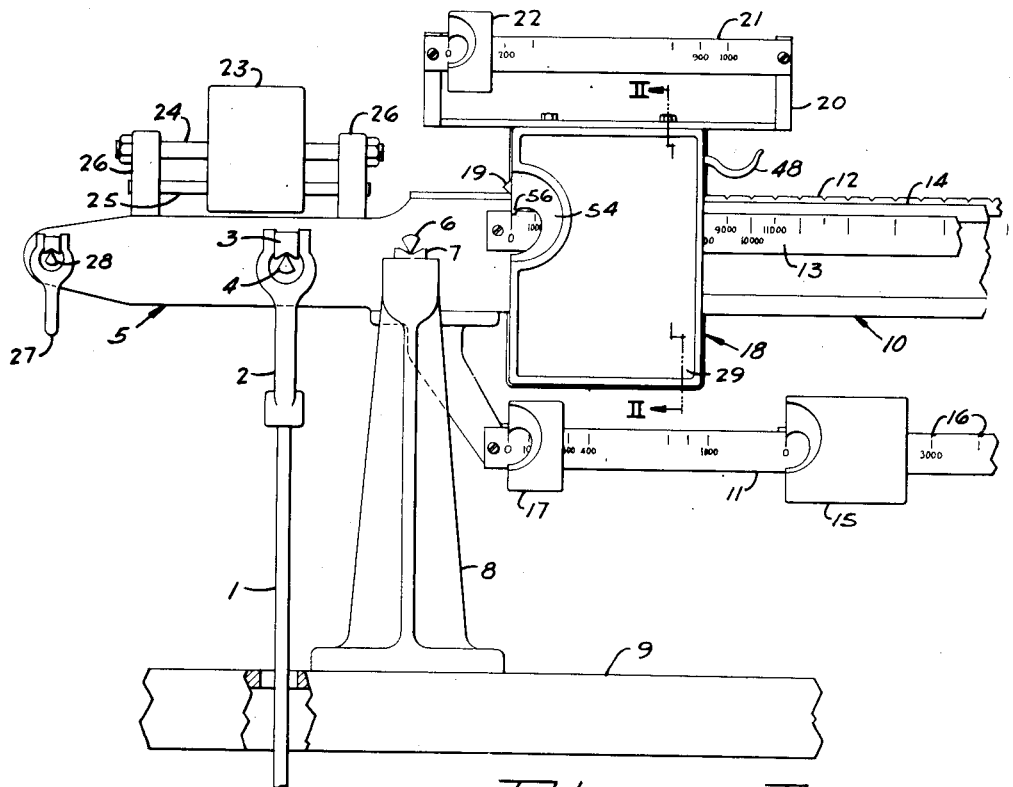
Fig. I
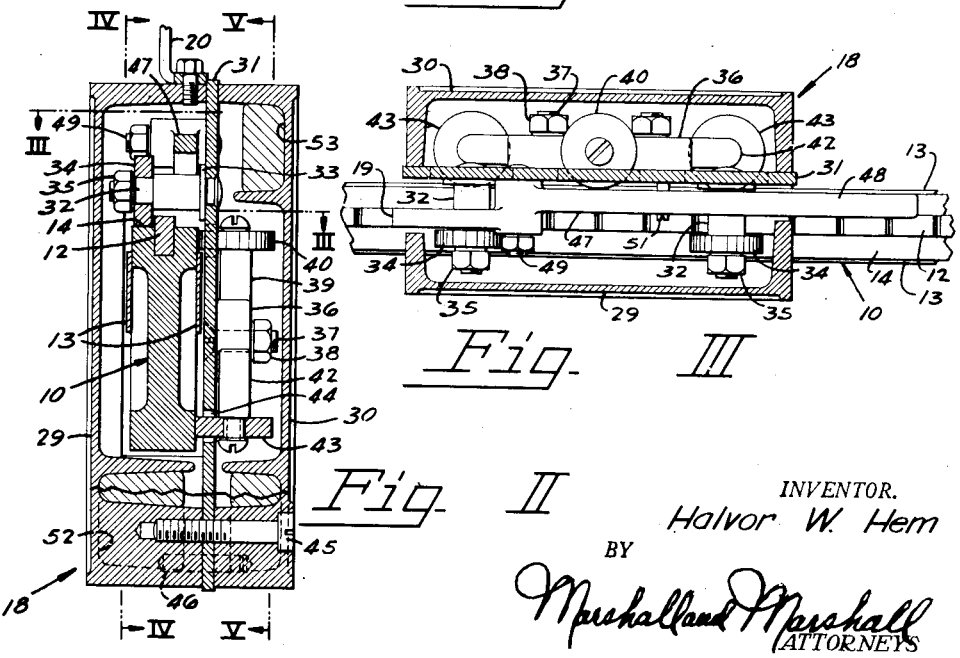
Fig. II  Fig. III
INVENTOR.
Halvor W. Hem
BY
Marshall and Marshall
ATTORNEYS Jan. 15, 1952 — H. W. HEM — 2,582,485
WEIGHING SCALE POISE
Filed March 23, 1946 — 2 SHEETS—SHEET 2
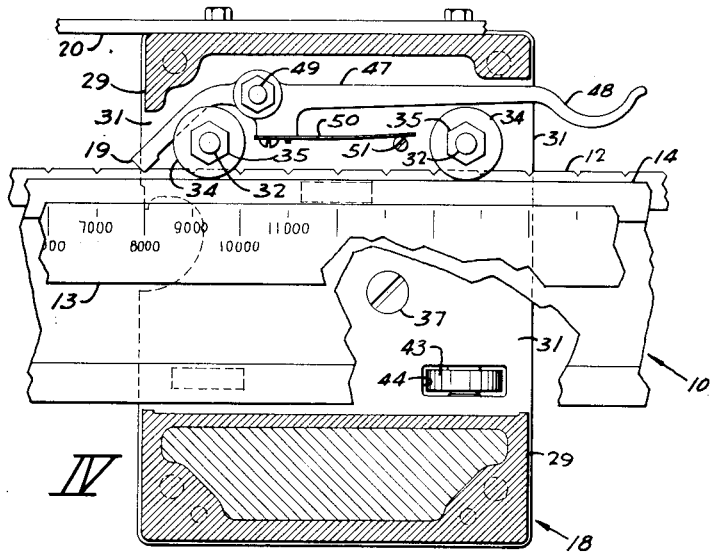
Fig. IV
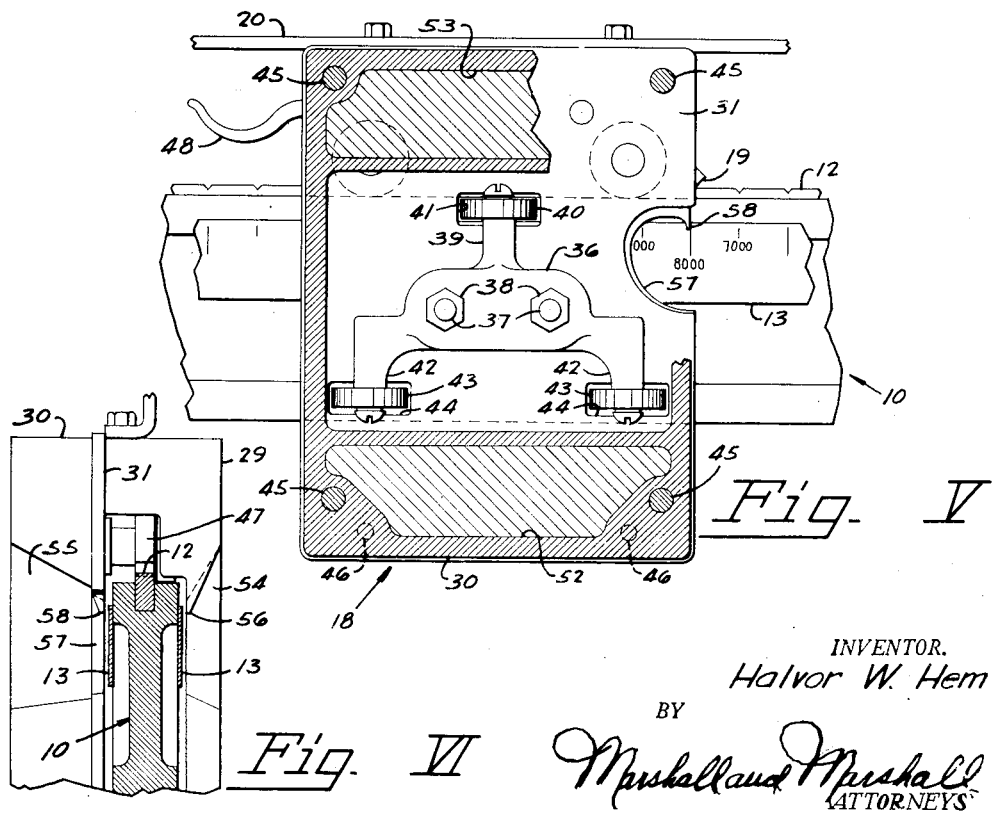
Fig. V
Fig. VI
INVENTOR.
Halvor W. Hem
BY
Marshall and Marshall
ATTORNEYS Patented Jan. 15, 1952

2,582,485

UNITED STATES PATENT OFFICE 2,582,485

WEIGHING SCALE POISE

Halvor W. Hem, Toledo, Ohio, assignor to Toledo Scale Company, Toledo, Ohio, a corporation of New Jersey Application March 23, 1946, Serial No. 656,726

3 Claims. (Cl. 265—565)

This invention relates to weighing scales and in particular to an improved poise for use on the weigh beam of a weighing scale.

It is common practice in the construction of high-capacity beam scales to use a heavy poise and to mount the poise on rollers so that it may easily be moved along the beam. It is customary to construct weighing scale poises of two parts, the division between the parts being along a vertical plane extending through the beam. These poises, when assembled, completely encircle the beam so that they may not be removed or easily altered in weight. When rollers are employed in such a poise each half of the poise journals one end of each roller axle. In order that the poise may roll easily the axles must be exactly parallel to each other as well as being exactly perpendicular to the plane dividing the parts of the poise. Any deviations from these precise conditions cause the rollers to crowd toward one side of the beam or the other and to introduce binding and friction as the poise is moved along the beam. In order that the roller axles be precisely perpendicular to the plane dividing the poise, the two portions of the poise must be machined to exact dimensions and be assembled in exact registry. These exacting requirements make the poise difficult and expensive to build.

The object of this invention is to provide an improved poise in which all of the rollers are journaled in one member.

Another object of the invention is to provide a poise having a frame on which rollers are mounted and to which weighted shells are attached.

More specific objects and advantages are apparent from the following description in which reference is made to the accompanying drawings.

The objects of the invention are attained by providing a generally flat plate with axles protruding from one side and journaling supporting rollers and also having other rollers journaled on axles parallel to the plane of the plate for guiding the plate along a weigh beam. A pair of weighted shells are provided which may be attached to opposite sides of the plate to enclose the rollers and to provide the required mass for the poise. Inasmuch as all of the axles or journaling means for the rollers are permanently fixed to the plate they cannot become deranged during the assembly of the poise onto the weigh beam. Furthermore, the axles may be set in the plate during the machining of the plate and during which time the requisite accuracy is easily maintained.

An improved poise constructed according to the invention is illustrated in the accompanying drawings.

In the drawings:

Figure I is a front elevation of a portion of a weigh beam having the improved poise mounted thereon.

Figure II is a vertical section of the improved poise as seen from the line II—II of Figure I.

Figure III is a horizontal section of the poise taken along the line III—III of Figure II.

Figure IV is a vertical section of the improved poise taken along the line IV—IV of Figure II.

Figure V is a vertical section taken along the line V—V of Figure II.

Figure VI is a fragmentary end elevation of the poise with the weigh beam shown in section.

These specific figures and the accompanying description are intended merely to illustrate the improved poise but not to impose limitations on the claims.

In a weighing scale incorporating the invention loads to be weighed are placed on a platform and the load forces are transmitted through a lever system which terminates in a steelyard rod 1 suspended from a stirrup 2 having bearing blocks 3 pivotally supported on a load pivot 4 for a weigh beam lever 5. The weigh beam lever 5 is rockably mounted on a fulcrum pivot 6 which rests in V-bearings 7 forming the upper part of a fulcrum stand 8 erected from a beam shelf 9. The weigh beam lever 5 has a main beam 10 and an auxiliary or tare beam 11. The main beam 10 has a notched bar 12 set into its upper surface, graduated indicia bearing plates 13 attached to its sides and a roller track 14 formed in its upper surface adjacent the notched bar 12. The auxiliary or tare beam 11 has a main tare poise 15 which is slidable along the tare beam 11 and is located by notches 16 cut into the upper surface of the beam. A fractional tare poise 17 is slidable along a portion of the tare beam 11 and has a total weighing capacity equal to the incremental weighing capacity represented by the space between the notches 16.

The main beam 10 is provided with a main poise 18 which is movable therealong and which is positioned by engaging a latch 19 into the notches of the notched bar 12. A U-shaped bracket 20 attached to the top of the main poise 18 carries a fractional beam 21 with its poise 22. The capacity of the fractional beam 21 is equal to the incremental capacity represented by the spacing of the notches in the notched bar 12.

The beam is brought into balance at no load and with all the poises set at zero by adjustment of a balance weight 23 which is slidable along rods 24 and 25 mounted in brackets 26 attached to and extending upwardly from the beam lever 5. When the initial pull of the load receiver supporting lever system is insufficient to bring the beam into balance within the range of adjustment of the counterweight 23 additional weights may be hung from a stirrup 27 pivotally suspended from a knife edge 28 set in the tail end of the beam lever 5.

The poise 18 comprises a front shell 29 and a rear shell 30 secured to opposite sides of a flat plate 31. A pair of axles 32 having integrally formed flanges 33 are riveted or otherwise secured into the upper portion of the plate so as to project to one side thereof. The axles 32 journal rollers 34 adapted to roll on the track 14 and to support the weight of the poise 18. Because the plate 31 is flat and the axles 32 have the integral flanges 33 formed thereon by a turning operation the axles when riveted in place are precisely parallel to each other and perpendicular to the plane of the plate 31. The rollers 34 will therefore roll along the track 14 without any tendency to run off in either direction. The rollers 34 are held in place on the axles 32 by nuts 35 threaded onto the ends of the axles.

A three-legged axle frame or spider 36 is attached to the back side of the plate 31, a pair of machine screws 37 with nuts 38 serving to hold it in place. The axle spider 36 has an upwardly extending arm 39 on which is journaled a roller 40. A rectangular opening 41 is cut through the plate 31 so that the periphery of the roller 40 may protrude therethrough to contact the side of the main beam 10 adjacent its upper surface. A pair of laterally spaced depending arms 42 of the spider 36 carry rollers 43 which extending through rectangular slots 44 contact the side of the main beam 10 adjacent its lower surface.

The rollers 40 and 43 provide three spaced points of support for guiding the plate 31 along the main beam 10, while the rollers 34 carry the weight of the plate and the shells 29 and 30. The arm 39 and the two arms 42, being integral parts of the axle spider 36 may be machined so that the journals for the rollers 40 and 43 are precisely parallel. Since the axles 32 are also precisely parallel optimum conditions for low friction are maintained regardless of the alignment of the shells 29 and 30. The shells 29 and 30 are attached to the plate by four bolts 45 which extend through drilled holes in the poise shell 30, through holes in the plate 31 and are threaded into tapped holes in the shell 29. If desired, for convenience in assembling, dowel pins 46 may be employed to locate the shell with respect to the plate.

The latch 19 forms the tip of a latch lever 47 having a handle portion 48 extending from the opposite end of the poise from the latch 19. The latch lever 47 is carried on a stud 49 which is riveted into the plate 31 and extends to the same side of the plate as the axles 32 and above the line of centers of the axles 32. The latch lever 47 is provided with a spring 50 which resting against a pin 51 threaded into the plate 31 urges the handle 48 upwardly and the latch 19 into firm engagement with the notches in the notched bar 12.

Pockets 52 and 53 in the shells 29 and 30 are partially filled with lead or other ballast material to adjust the weight of the poise.

The poise has C-shaped indicia viewing openings 54 and 55 formed in the shells 29 and 30 respectively (see Figure VI). The C-shaped opening 54 is formed completely within the shell 29 and includes an index 56 adapted to cooperate with the indicia on the graduated bar 13. The plate 31, which is located on the back side of the beam as viewed in Figure I, has a C-shaped opening 57 including an index portion 58. The periphery of the C-shaped opening 57 is beveled to correspond to the general contour of the viewing opening 54 insofar as the thickness of the plate 31 will permit. The C-shaped opening 55 in the shell 30 is slightly greater than the opening 57 in the plate 31 and is beveled so that the opening 55 and the opening 57 taken together approximate the shape of the viewing opening 54. The adjoining edges of the openings 55 and 57 in the shell 30 in the plate 31 respectively do not register exactly, the opening 57 being the smaller so that considerable error in positioning the shell 30 on the plate 31 will not produce an unsightly appearance in the viewing opening.

The improved poise is easily manufactured and provides exceptional ease in operation. It may be assembled and disassembled repeatedly, as is often required in adjusting a scale, without in any way affecting the alignment of the roller axes or otherwise increasing the friction resisting motion of the poise along the beam.

The specific construction illustrated in the drawing may be modified as required without departing from the scope of the invention.

Having described the invention, I claim:

1. A poise for use on a weigh beam, the poise comprising a plate serving as a chassis for the poise, a plurality of axles each having one end rigidly attached to the plate and extending from a face of the plate, a bracket attached to the plate, a plurality of axles each having an end supported by the bracket and extending parallel to a face of the plate, each of the axles having a free end, a roller mounted on the free end of each axle, said axles being arranged so that the rollers may support the plate from the weigh beam, and a weighted shell attached to the plate and serving as a housing.

2. A poise for use on a weigh beam, the poise comprising a plate serving as a chassis for the poise, a pair of axles rigidly mounted in the plate end extending generally perpendicular to the sides of the plate, bracket mounted on the side of the plate opposite the axles, a plurality of axles extending from the bracket and parallel to the side of the plate, said plate having apertures adjacent each of the bracket axles, each of the axles having a free end, rollers mounted on each of the free ends some of which rollers protrude through the apertures, said axles being arranged so that the rollers may support the poise from the weigh beam, and weighted shells for covering the sides of the plate and the rollers.

3. A poise for a weigh beam, the poise comprising a plate serving as a chassis for the poise, a pair of axles rigidly mounted in the plate and extending generally perpendicular to the side of the plate, a pair of rollers one journaled on the free end of each of the rigidly mounted axles, said axles being located so that the rollers may engage a track on the top of the weigh beam, a bracket on the side of the plate opposite the axles, a plurality of axles carried on the bracket and extending parallel to the side of the plate, rollers journaled on the free ends of the axles, said plate having apertures to receive the last mentioned rollers, the bracket and rollers being arranged such that the rollers may engage a side face of the weigh beam, and weighted covers that are attached to the plate and that serve to house the rollers.

HALVOR W. HEM.

REFERENCES CITED

The following references are of record in the file of this patent:

UNITED STATES PATENTS

| Number | Name | Date |
|---|---|---|
| 1,049,535 | Rosenfield | Jan. 7, 1913 |
| 1,094,722 | Kintz | Apr. 28, 1914 |
| 1,869,357 | Fuller | Aug. 2, 1942 |
| 2,321,717 | Wallace | June 15, 1943 |